Aug. 30, 1932.     R. G. DAVIS     1,875,223
MEANS FOR REVIVIFICATION OF SPENT ACTIVATED CARBONS
Original Filed Aug. 19, 1930.
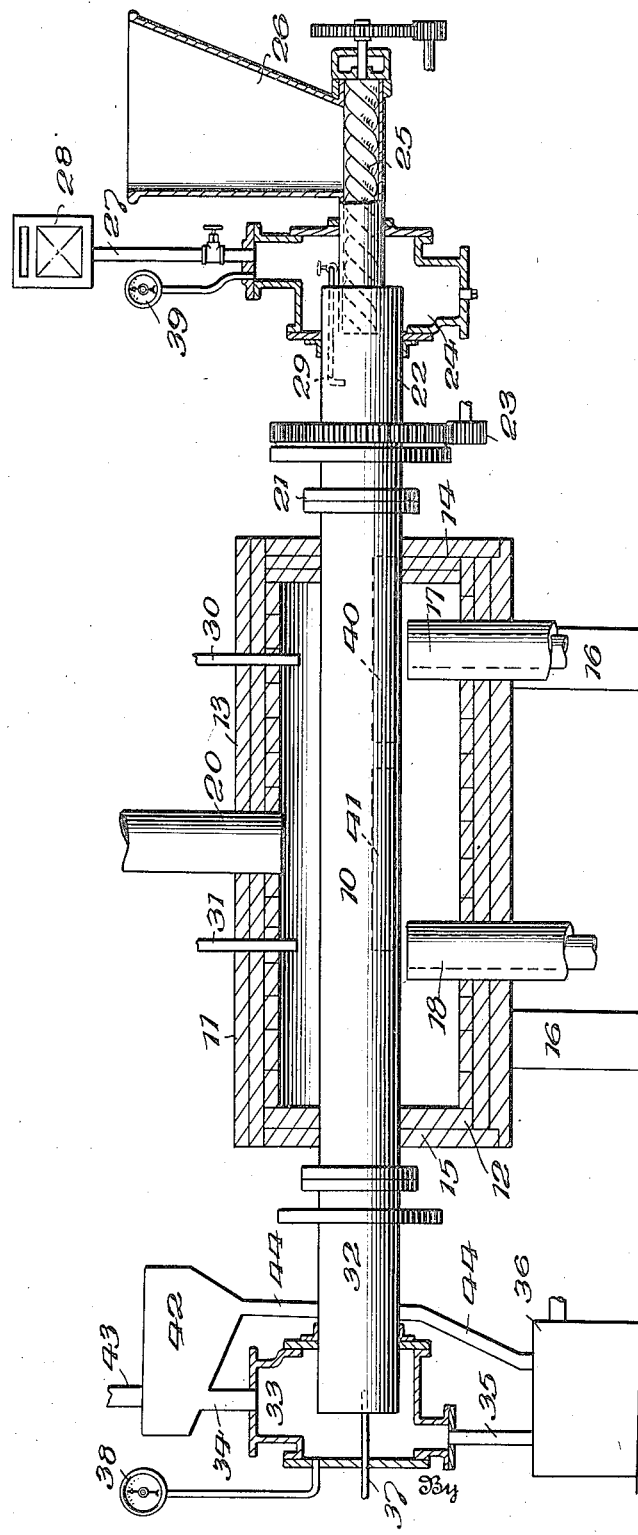
Inventor
Raymond G. Davis,
By K. P. McElroy
His Attorney Patented Aug. 30, 1932

1,875,223

UNITED STATES PATENT OFFICE

RAYMOND G. DAVIS, OF WILMINGTON, DELAWARE, ASSIGNOR TO DARCO CORPORATION, OF WILMINGTON, DELAWARE, A CORPORATION OF DELAWARE

MEANS FOR REVIVIFICATION OF SPENT ACTIVATED CARBONS

Original application filed August 19, 1930, Serial No. 476,330. Divided and this application filed December 4, 1931. Serial No. 579,056.

This invention relates to means for revivification of spent activated carbons; and it comprises an assemblage of apparatus elements, particularly useful in burning off the adsorbed organic matter of spent carbon with a minimum of gasification of the originally active carbon, wherein a rotatable horizontal tube having its central portion disposed in a heating furnace is provided with a closed stationary charge head and a discharge head at either end of the tube outside the furnace, with conveyor means entering the tube through the charge head, with means for passing an air current through the charge head and into the tube around the mouth of the conveyor, with means for regulating a feed of powdered carbon by the conveyor and with separate means for regulating the air current, the arrangement being such as to disperse and suspend powdered carbon in the air current within the tube and to blow the carbon quickly through the tube, the tube being usually further provided with a separate valve-controlled steam inlet conduit passing through the charge head into the tube; all as more fully hereinafter set forth and as claimed.

Activated carbon is in wide use in the refining of various liquids, notably sugar solutions and oils of different kinds. The chief function of activated carbon is the adsorption of impurities, coloring matter etc. from solutions or liquids generally, the carbon becoming "spent" or saturated with the impurities. Revivification or reactivation of the spent carbon to restore its adsorbing power is becoming increasingly important. The present invention relates particularly to such restoration but is applicable, with only small variations in procedure to the production of activated carbon from raw carbonizable materials, lignite for example.

In the prior art, revivification of spent carbon has been carried on for the most part in two ways; the spent carbon being heated either with exclusion of air to relatively high temperatures or to comparatively low temperatures in the presence of air. Also certain patented methods of making activated carbons from various raw materials have been recommended for use in reactivation of spent carbons but these methods have usually involved the use of gases other than air, such as steam and products of combustion containing $CO_2$. These methods have not been particularly adapted to revivification purposes.

The chief objection to heating the spent carbon alone without oxidizing agents is the charring of the adsorbed organic matter and the clogging of the pores with secondary carbon which results in a product of low adsorbing activity. Heating the carbon in the presence of air results usually in gasification of a substantial part of the original carbon, or, when the temperature is kept low, the action is slow and the capacity of the apparatus used is restricted. When the air has been limited in amount, its action has been localized, part of the product having been overburned and another part underburned.

I have found that when spent activated carbon is dispersed and suspended in a carefully regulated current of air, and the mixture quickly brought up to an ignition temperature, ignited and then quickly cooled, the adsorbed organic matter is selectively burned off and leaves a reactivated carbon closely approximating in amount and activity the original activated carbon. Apparently the original carbon is merely cleared of adsorbed matter and its activity thereby restored.

Activated carbon used, for example, on impure glucose solutions, sugar sirups, etc., adsorbs not only coloring matter but a wide variety of other organic impurities of whose chemical nature not much is known. But I have found that all this adsorbed matter in a dry condition is quite readily oxidizable by the air, much more so than the underlying carbon; and that, by a proper regulation of conditions the adsorbed organics can be burnt off the spent carbon by what may be called selective oxidation. In so doing, the original activated carbon reappears in its original amount, without much addition or subtraction, and with its original properties. Apparently there is but little destructive distillation of adsorbed matter with formation of new carbon, the adsorbed organic matter being apparently completely removed and oxidized. Adsorbed mineral matter often causes an apparent increment in weight of the regenerated carbon but if this is removed by an acid wash, the weight of the reactivated material comes back to near that of the original.

With selective oxidation, the action tends to be thermally self-supporting in the sense that with the mixture of air and suspended carbon brought to the proper temperature and ignited no further supply of heat is necessary to the reaction. The oxidation, upon ignition, is quick and complete, the air oxygen forming $CO_2$ but with little CO. This enables the use of economical types of tubular apparatus of relatively large dimensions and high throughout.

Obtaining the result stated requires a nice control of conditions but there is no great difficulty in this. With the spent carbon dispersed in a limited supply of air, and passed through a hot tube, the progress of the action can be followed by analysis of the effluent gases and of the ash content of the product. In a general way, appearance of any substantial amount of CO and $H_2$ means too active an action and the heating is too great or the supply of air too ample, causing attack on the carbon. In regulating the action, water vapor, either that coming from the spent carbon or introduced with the air as steam, is useful and makes control easier.

In operating the process the spent carbon is introduced together with the proper amount of air into a horizontal tube having its central portion heated by a suitably disposed furnace to a temperature of 800° to 1000° C., which has been found sufficient in most cases to start the ignition. The tube is provided with a closed charge head outside the furnace through which the carbon is conveniently conveyed into the tube by means of a spiral screw conveyor in a closed pipe running through the charge head and the air is blown through a space in the charge head and tube surrounding the carbon conveyor. As the carbon drops from the conveyor it is picked up by the air current passing around the conveyor pipe and carried in dispersed particles by the air into the hottest portion of the tube which may be heated by any convenient means such as a combustion furnace. The tube may be rotated so as to keep the carbon in continuous suspension and it may be provided with flights to aid in the dispersion of the carbon particles throughout the air. The air is carefully proportioned to the adsorbed volatile matter in the spent carbon; the content of such organic matter being determined by laboratory methods. It has been found that a ratio between 60 and 150 cubic feet of air (under atmospheric conditions of temperature and pressure) per pound of adsorbed organic matter suffices to clean the carbon with but little attack on the carbon itself. This air ratio varies somewhat with the nature and composition of the adsorbed matter.

It is found that ignition of the air-carbon mixture can be effected by heating the tube at the charge end only of the furnace and that once started the oxidation completes itself with production of $CO_2$ and only small amounts of CO. The greater part of the carbon in finely divided form is carried through the tube by the air current, but lumps are passed along through the tube in the rotation thereof with but slight inclination of the tube. At the discharge end of the tube outside of the furnace, the gaseous products are separated from the reactivated product in a discharge head and dust collector. The dimensions of the tube, the rate of blowing the air and of feeding the spent carbon and the external heating of the tube are so correlated as to give sufficient time in the tube for the reaction to be completed therein but not sufficient time for substantial reaction of $CO_2$ and $H_2O$ upon the carbon. The temperature inside the tube is maintained for the most part by the heat of reaction, this being aided by the heat imparted by the furnace, which heat is conveniently obtained from the combustion of gaseous fuel. The tube may, however, be electrically heated.

In the accompanying drawing I have shown more or less diagrammatically an apparatus within the purview of my invention and useful in carrying on the described process. In this showing the figure represents a view in vertical section of a horizontal tube heated in a combustion furnace and provided with a charge head and a discharge head.

Referring to the figure, the horizontal tube 10, made of suitable heat resistant material, is disposed in combustion furnace 11 comprising fire brick base 12, roof 13 and end walls 14 and 15 with supporting columns 16. The furnace is provided with gas burners 17 and 18 and with the stack 20. At the charge end the tube 10 is coupled at 21 with an extension piece 22. The tube is rotatable by means of gearing 23. Fitted over the end of section 22 is charge head 24. Into the charge head and projecting into extension 22 is inserted the rotary conveyor 25 which is adapted to take spent carbon from feed hopper 26 and deliver it into tube extension 22. Delivering into the top of the charge head 24 is air line 27 which runs from an air pressure blower, not shown, through orifice meter 28. Valved steam pipe 29 is provided to introduce steam into the air-carbon suspension in the tube. The air current travels around conveyor 26 and becomes mingled with the carbon dropping from the conveyor inside the tube. The carbon is thus dispersed and suspended in the air current. In the furnace are inserted thermo-couples 30 and 31. At the discharge end the tube 10 is coupled to extension piece 32 which extends into discharge head 33 provided with pipe 34 leading to dust collector 42 and thence by gas conduit 43 to an exhaust blower not shown. Reactivated carbon is passed from the dust collector by conduit 44 to collecting tank 36. The gas line may have a cooler or heat recuperator. Discharge pipe 35 delivers reactivated product from the discharge head 33 into tank 36. In the discharge head is thermo-couple pyrometer 37, for measuring the temperature of the products leaving the tube. The discharge head and the charge head are fitted respectively with pressure gauges 38 and 39. The tube may be provided with flights such as indicated at 40 and 41.

In a specific embodiment of the invention a spent carbon from a glucose refinery was reactivated. This spent material contained about 24 per cent of moisture and (on a dry basis) 21 per cent of ash and 20 per cent of adsorbed volatile matter. The material was ground to pass a 40 mesh screen. The furnace was heated until thermo-couple 30 at the charge end of the furnace registered 850° C. when the heating was continued by burner 17 alone, burner 18 being turned off. Then the feed of spent carbon was started and was fed continuously at the rate of 464 pounds of moist material per hour. The rate of air blowing was regulated at 139 cubic feet per minute which was 118 cubic feet of air per pound of volatile matter in the spent carbon. At the same time steam was admitted through pipe 29 at the rate of 89 pounds per hour which was 25 pounds of steam per 100 pounds of dry carbon fed. The temperature at thermo-couple 37 in the discharge head registered after some time 850° C. while thermo-couple 31 at the discharge end of the furnace registered 753° C. The dimensions of the tube in this furnace were 14.75 inches inside diameter and 13 feet 6 inches long with extension pieces 22 and 32 each 4 feet long. The tube was rotated at a rate of two revolutions per minute. The two flights in the tube were each 48 inches long by 4 inches high, the one in the charge end of the tube, the other in the middle of the tube. These served to keep the charge of material agitated and to maintain the dispersion of the solid material in the air and the reaction gases as formed. The external heating of the tube required 590 cubic feet of natural gas per hour.

In order to prevent air entering the apparatus from the outside and loss of air at the charge end of the tube, atmospheric pressure was maintained inside the tube at the charge end as indicated by pressure gauge 39. The pressure at the discharge end (gauge 38) was from 0.02 to 0.05 inches of water below atmospheric, maintained by means of the exhaust blower. With such pressures the fittings at both ends of the tube are readily made sufficiently tight to prevent leakage of gas. The product collected in tank 36 below the discharge head at the rate of 255 pounds per hour. It analyzed 28.9 per cent ash on a dry basis. The yield was thus over 90 per cent of the original carbon. The reactivated product, after the usual acid washing to remove adsorbed inorganic matter, had a decolorizing efficiency of 98 per cent compared with the original activated carbon. The gases issuing through pipe 34 analyzed (dry) 17.2 per cent $CO_2$ and 4.3 per cent CO, with a slight indeterminate amount of hydrogen, indicating that the oxidation of hydrogen contained in the organic matter overbalanced the decomposition of steam.

Steam introduced in the charge end of the tube with the air serves to dampen or smooth out the internal reaction. This results in a more uniform internal heat and holds the temperature within bounds. I regard the use of steam in this connection as advantageous but not essential since successful and efficient reactivations have been accomplished when working on a dry material (moisture below 4 per cent) and with no steam introduced with the air.

For best results it is necessary to have the furnace temperature high enough at the charge end to start the reaction in the entering material as the air and spent carbon reach the heated portion of the tube and thus to afford time for the reaction to complete itself before the materials leave the tube. For this purpose it has been found that temperatures of 800 to 950° C. at the charge end of the furnace (pyrometer 30) usually suffice in apparatus of dimensions as above specified. Quick heating of the air-carbon mixture to the ignition temperature starts the reaction at the charge end of the heated tube and completes the reaction in the tube. With air ratios between 120 and 130 cubic feet per pound of adsorbed organic matter and temperatures in the charge end of the furnace of 800 to 950° C., the capacity of the furnace is high; the yield upwards of 90 per cent of original carbon, the activity of the product nearly equal to that of the original activated carbon and the process generally efficient.

For regulation of the operation, the discharge temperature, (pyrometer 37) air ratio, gas analysis and the comparative ash content of the spent carbon and reactivated product are observed. Adjustment is secured by varying the air volume and varying the temperature at the charge end by means of gas burner 17. If the ash content of the product increases unduly, either the air ratio or the charge end furnace temperature or both are decreased and vice versa. With a fixed rate of feeding spent carbon, the air volume blown is usually left constant at a rate between the equivalent of 110 and that of 140 cubic feet per pound of adsorbed organic matter. In working on a uniform material not much variation of the air ratio is required. Control of the process is then by adjustment of the furnace temperature. This adjustment is made at burner 17 upon reading pyrometer 37 at the discharge end of the tube. It has been found that with air ratios as specified, the discharge temperatures are somewhere between 800° and 1050° C. The object is to restore the spent carbon to an adsorbent or decolorizing activity equal to that of new activated carbon and to do this without loss of carbon. It has been found that consistently good results are obtained when the air ratio and the furnace temperature at the charge end are so regulated that the ash content of the product as it leaves the furnace bears a ratio to that of the spent material charged (on a dry, organic volatile free basis) not exceeding 1.1:1. Even with this ratio less than 1.05 to 1 it is possible to obtain a product of 95 to 100 per cent relative decolorizing efficiency.

Sometimes the decolorizing power of the reactivated carbon exceeds that of the original carbon, but as a rule the yields of these more highly activated products are less than the yield of a product having an activity approaching but not exceeding that of the original activated carbon.

While the operation of the apparatus assemblage has been described with specific reference to reactivation of spent carbon, the apparatus is generally useful in the activation of raw carbonaceous materials to produce activated carbon. Activation of such raw materials by the exothermic action of air thereon can be successfully accomplished at low cost by means of the described apparatus. In particular, the coacting charge head, air inlet and conveyor arrangement with the steam inlet delivering into the tube, the arrangement comprising separate means of regulating the feed of carbon, the air current and the proportion of steam, permits of close coordination of the exothermic reaction of the air with the combustible matter upon their ignition in the tube with the cooling effect of the steam, this coordination being reflected in a uniformly activated product and in a high rate of through-put with utilization, when desired, under controlled conditions, of the raw material itself as a source of a substantial proportion of the heat needed for maintaining the activating temperature.

This application is a division of my prior and copending application Serial No. 476,330, filed August 19, 1930.

What I claim is:—

1. An apparatus for activating carbon containing adsorbed organic matter, which comprises a horizontal rotatable tube having a portion disposed in a heating furnace, a charge head fitted around one end of said tube outside the furnace, closed conveying means extending through the charge head into the tube, said conveying means being adapted to deliver a continuous stream of the carbon in powdered form into the tube, means for introducing a current of air through the charge head and around the conveying means into the tube, and means for regulating the feed of carbon and of air, the tube, charge head, conveyor and air introducing means being adapted to disperse and suspend the powdered carbon leaving the conveyor in the air current and to blow the carbon through the tube.

2. Apparatus for activating carbon by selective oxidation with air or other oxidizing gas comprising, in combination, a horizontal rotatable tube having a portion disposed in a combustion furnace, a chamber fitted around one end of said tube, said chamber being provided with means for admitting thereto a gas current to be passed through the tube, conveying means extending through said chamber into the end of the tube, said conveying means being spaced away from the inside of the chamber and also being spaced away from the inside of the tube, the conveying means being thereby adapted in its position relative to the chamber and to the tube to introduce, disperse and suspend finely divided carbon in the gas current admitted through the chamber into the tube, means for separately regulating the feed of carbon and the rate of the gas current, means for receiving gases and carbon suspended therein from the other end of the tube and connected means for separating the activated carbon from the gases.

3. In means for reactivating carbons containing adsorbed organic matter by burning off said matter with air, said means comprising an externally heated rotatable horizontal tube, a combination of a horizontal conveyor adapted to drop the carbon in finely divided form into the tube at one end thereof and above the bottom of the tube, of means for introducing an air current around the conveyor into the same end of the tube, said air introducing means and conveyor means being relatively positioned so as to suspend the carbon in the air current and adapted to propel the carbon suspension through the tube, of means for regulating the rate of feed of the carbon by the conveyor and of separate means for regulating the rate of air introduction.

4. In apparatus for activating carbon by an exothermic process, a combination with a horizontal rotatable tube having a central portion disposed in a heating furnace of a stationary closed charge head fitted around an end of the tube outside the furnace, of conveyor means entering the tube through the charge head and peripherally spaced from the tube, of regulated air inlet means in the charge head adapted to pass a current of air into the tube around the conveyor means and of a valve controlled steam inlet conduit passing through the charge head into the tube.

5. In apparatus for activating carbon by selective oxidation with air in a rotating horizontal tube heated externally, a stationary chamber fitted around one end of said tube, a conveyor extending through said chamber into the tube and means for introducing a current of air into said chamber to pass around said conveyor into the tube, the arrangement of said tube, chamber, conveyor and air introducing means being adapted to form within the tube a dispersed mixture of finely divided carbon and air in regulated proportions and to carry said dispersed mixture through the tube by the force of the air current.

In testimony whereof, I have hereunto affixed my signature.

RAYMOND G. DAVIS.